United States Patent
Lyons et al.

(10) Patent No.: US 6,585,913 B2
(45) Date of Patent: Jul. 1, 2003

(54) SCINTILLATOR COMPOSITIONS OF ALKALI AND RARE-EARTH TUNGSTATES

(75) Inventors: Robert Joseph Lyons, Burnt Hills, NY (US); Sergio Martins Loureiro, Albany, NY (US); James Scott Vartuli, Rexford, NY (US); Venkat Subraman Venkataramani, Clifton Park, NY (US)

(73) Assignee: General Electric Company, Niskayuna, NY (US)

( * ) Notice: Subject to any disclaimer, the term of this patent is extended or adjusted under 35 U.S.C. 154(b) by 80 days.

(21) Appl. No.: 09/918,431

(22) Filed: Jul. 30, 2001

(65) Prior Publication Data

US 2003/0020044 A1 Jan. 30, 2003

(51) Int. Cl.$^7$ .............................................. C09K 11/68
(52) U.S. Cl. ........................ 252/301.5; 252/301.4 R; 252/301.17; 423/263
(58) Field of Search ................... 252/301.5, 301.4 R, 252/301.17; 423/263; 501/2, 32, 50

(56) References Cited

U.S. PATENT DOCUMENTS

| | | | |
|---|---|---|---|
| 3,174,938 A | * 3/1965 | Soden et al. | ............. 252/301.5 |
| 4,421,671 A | 12/1983 | Cusano et al. | |
| 4,473,513 A | 9/1984 | Cusano et al. | |
| 4,525,628 A | 6/1985 | DiBianca et al. | |
| 4,783,596 A | 11/1988 | Riedner et al. | |
| 5,882,547 A | 3/1999 | Lynch et al. | |
| 6,093,347 A | 7/2000 | Lynch et al. | |

FOREIGN PATENT DOCUMENTS

JP    4-104099    * 4/1992

OTHER PUBLICATIONS

Trunov et al, "Double Tungstates of Caesium and the Rare Earth Elements", Russian Jour. Inorg. Chem., vol. 19, No. 2, pp. 188–190, 1974.*
Torardi et al, "Structure and Luminescence of Some CsLnW2O8 Compounds", Jour. Solid State, vol. 69, pp 171–78, 1987.*
Nobuhiro Iwase et al., "Photostimulated luminescence of BaBr2:Eu," Journal of Luminescence, vol. 60 & 61, pp. 618–619 (1994).
C. C. Torardi et al., "Structure and Luminescence of Some CsLnW2O8 Compounds," Journal of Solid State Chemistry., vol. 69, pp. 171–178 (1987).
V.K. Trunov and V.K. Rybakov, "Double Tungstates of Caesium and the Rare Earth Elements," Russian Journal of Inorganic Chemistry, vol. 19, No. 2, pp. 188–190 (1974).

* cited by examiner

Primary Examiner—C. Melissa Koslow
(74) Attorney, Agent, or Firm—Toan P. Vo; Noreen C. Johnson

(57) ABSTRACT

Scintillator compositions useful for the detection of high-energy radiation, such as X, β, or γ radiation, contain alkali and rare earth pyrotungstates. In particular, the pyrotungstate is a double tungstate containing an oxide of an alkali metal selected from the group consisting of Na, K, Rb, and Cs and an oxide of a rare-earth element selected from the group consisting of Y, Gd, La, and Lu. The scintillators are characterized by high light output, reduced afterglow, short decay time, and high X-ray stopping power.

29 Claims, 6 Drawing Sheets

SCINTILLATOR COMPOSITIONS OF ALKALI AND RARE-EARTH TUNGSTATES

BACKGROUND OF THE INVENTION

This invention relates to scintillator compositions and, more particularly, to solid-state X-ray scintillator compositions containing alkali and rare-earth tungstate. The present invention also relates to methods of producing such compositions.

Solid-state scintillator materials are in common use as component of radiation detectors in apparatus such as counters, image intensifiers and computed tomography ("CT") scanners. Scintillator materials especially find widespread use in X-ray detectors. One embodiment of the present generation of solid-state ceramic scintillators comprises oxide mixtures in which a rare-earth oxide is present as an activator, along with various combined matrix elements, which are also usually rare-earth oxides. Other metallic compounds may also be present as additives for specific purposes. These scintillators have been characterized by the advantageous properties of high efficiency, moderate decay time, low afterglow and little or no radiation damage upon exposure to high X-ray doses.

One important property of CT systems is scan time which is the time required for a CT system to scan and acquire an image of a slice of the object under observation. Scan times of CT systems are related to primary decay time (sometimes simply "decay time" hereinafter) of the scintillator roughly by a factor of 1000. Thus, a scintillator having a decay time of 1 millisecond will typically produce a scan time of about 1 second. The scanning units containing the present generation of scintillators have scan times on the order of 1 second, and in any event no lower than about 0.7 second.

In future generations of CT scanners and the like, shorter scan times are desired. This is true because decreasing scan time makes possible an increase in patient volume covered in a given time, usually a single breath hold. Also, it reduces image blurring due to motion of internal organs and of non-cooperating patients, including pediatric patients.

Scan times of this magnitude may be achievable if the primary decay time of the scanner is shortened. In general, scan time in seconds is associated with a primary decay time of an equal number of milliseconds. As the speed of data processing in CT scanners increases due to advances in electronic circuit designs, it is desired to have faster scintillators, i.e., shorter time between receipts of stimulating radiation pulses so to fully take advantage of the capability of the scanner. Therefore, any measurable percentage decrease in decay time from that exhibited by the present generation of ceramic scintillators would be a distinct improvement, particularly when accompanied by the other advantageous properties described above.

Among the preferred scintillator compositions in the present generation of CT scanners are the ceramic scintillators employing at least one of the oxides of lutetium, yttrium, and gadolinium as matrix materials. These are described in detail, for example, in U.S. Pat. Nos. 4,421,671, 4,473,513, 4,525,628 and 4,783,596. They typically comprise a major proportion of yttria ($Y_2O_3$), up to about 50 mole percent gadolinia ($Gd_2O_3$) and a minor activating proportion (typically about 0.02–12, preferably about 1–6 and most preferably about 3 mole percent) of a rare earth activator oxide. Suitable activator oxides, as described in the aforementioned patents, include the oxides of europium, neodymium, ytterbium, dysprosium, terbium, and praseodymium. Europium-activated scintillators are often preferred in commercial X-ray detectors by reason of their high luminescent efficiency, low afterglow level, and other favorable characteristics. Europium is typically present therein in amounts up to 30 and most often up to about 12, preferably in the range of 1–6 and most preferably about 3 mole percent. Decay times of such scintillators are on the order of 0.9–1.0 millisecond.

The search thus continues for ceramic scintillator compositions having shorter decay times in combination with the aforementioned other advantageous properties.

SUMMARY OF THE INVENTION

The present invention provides improved scintillator compositions comprising alkali and rare-earth tungstates useful in the detection of high-energy radiation, such as X, β, or γ radiation. Particularly, the scintillators of the present invention have higher light output, reduced afterglow, short decay time, and high X-ray stopping power in X-ray detection applications.

The scintillator compositions of the present invention are alkali and rare-earth tungstates and have a general formula of $AD(WO_4)_n$; wherein A is at least one element selected from the group consisting of Na, K, Rb, and Cs; D is at least one rare-earth element selected from the group consisting of Y, La, Ce, Pr, Nd, Pm, Sm, Eu, Gd, Tb, Dy, Ho, Er, Tm, Yb, and Lu; and n is greater than or equal to 2. Such a tungstate is also commonly referred to as a pyrotungstate because each unit cell contains multiple $WO_4^{2-}$ ions. When n is equal to 2, it is commonly referred to as a double tungstate.

According to one aspect of the present invention, the scintillator composition has a formula of $CsY_{1-x}Gd_x(WO_4)_2$ or $CsLa_{1-y}Lu_y(WO_4)_2$, wherein $0 \leq x \leq 1$ and $0 \leq y \leq 1$, and is useful as an X-ray scintillator. Such a scintillator efficiently absorbs X radiation and emits electromagnetic radiation in the visible region.

According to another aspect of the present invention, a method for producing a scintillator composition comprises the steps of: (1) providing amounts of (a) oxygen-containing compounds of at least one alkali metal selected from the group consisting of Na, K, Rb, and Cs, (b) oxygen-containing compounds of at least one rare-earth element selected from the group consisting of Y, La, Ce, Pr, Nd, Pm, Sm, Eu, Gd, Tb, Dy, Ho, Er, Tm, Yb, and Lu, and (c) at least one oxygen-containing compound of tungsten; (2) mixing together the compounds to form a mixture; (3) optional adding at least one fluxing compound selected from the group consisting of halides of Na, K, Rb, Cs, Y, La, Ce, Pr, Nd, Pm, Sm, Eu, Gd, Tb, Dy, Ho, Er, Tm, Yb, Lu, and W in the mixture in a quantity sufficient to act as a flux; and (4) firing the mixture at a temperature and for a time sufficient to convert the mixture to a solid solution of alkali and rare-earth tungstate.

In another aspect of the present invention, a solution of (a) compounds of at least one alkali metal selected from the group consisting of Na, K, Rb, and Cs, (b) compounds of at least one rare-earth element selected from the group consisting of Y, La, Ce, Pr, Nd, Pm, Sm, Eu, Gd, Tb, Dy, Ho, Er, Tm, Yb, and Lu, and (c) at least one compound of tungsten is precipitated in a basic solution to obtain a mixture of oxygen-containing compounds of at least one alkali metal, at least one rare-earth metal, and tungsten. The precipitate is calcined in an oxidizing atmosphere and then fired at a temperature for a time sufficient to convert the calcined material to a solid solution of alkali and rare-earth tungstate.

In still another aspect of the present invention, an alkali and rare-earth tungstate having a formula of $AD(WO_4)_2$; wherein A is at least one element selected from the group consisting of Na, K, Rb, and Cs; and D is at least one rare-earth element selected from the group consisting of Y, La, Ce, Pr, Nd, Pm, Sm, Eu, Gd, Tb, Dy, Ho, Er, Tm, Yb, and Lu; is incorporated in an X-ray detector of a CT system.

Other features and advantages of the present invention will be apparent from a perusal of the following detailed description of the invention and the accompanying drawings in which the same numerals refer to like elements.

DETAILED DESCRIPTION OF THE INVENTION

Figure 1:
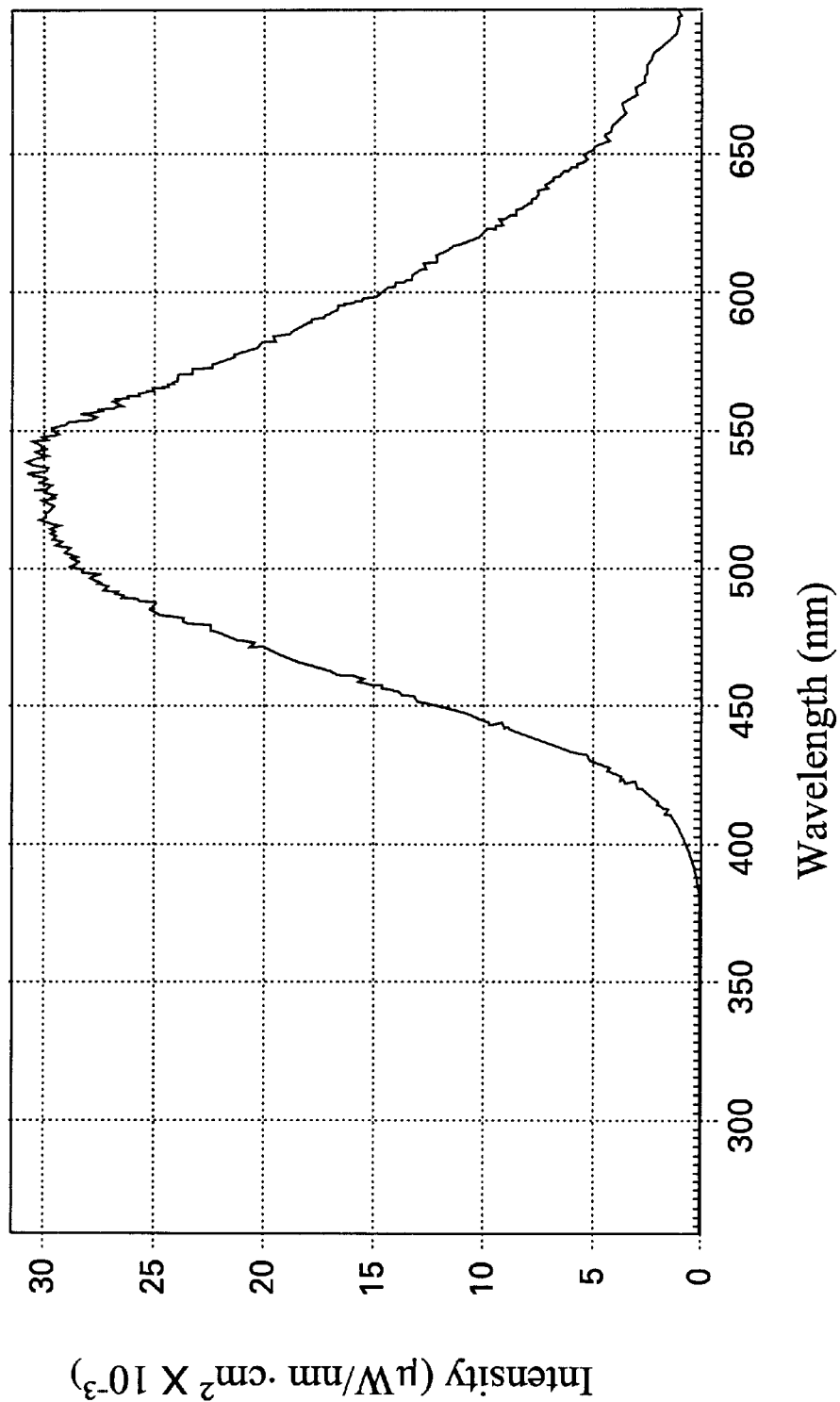
FIG. 1 is an emission spectrum of the $CsGd(WO_4)_2$ scintillator of the present invention under X-ray excitation having a peak energy of 60 keV from a tungsten anode.
Figure 2:
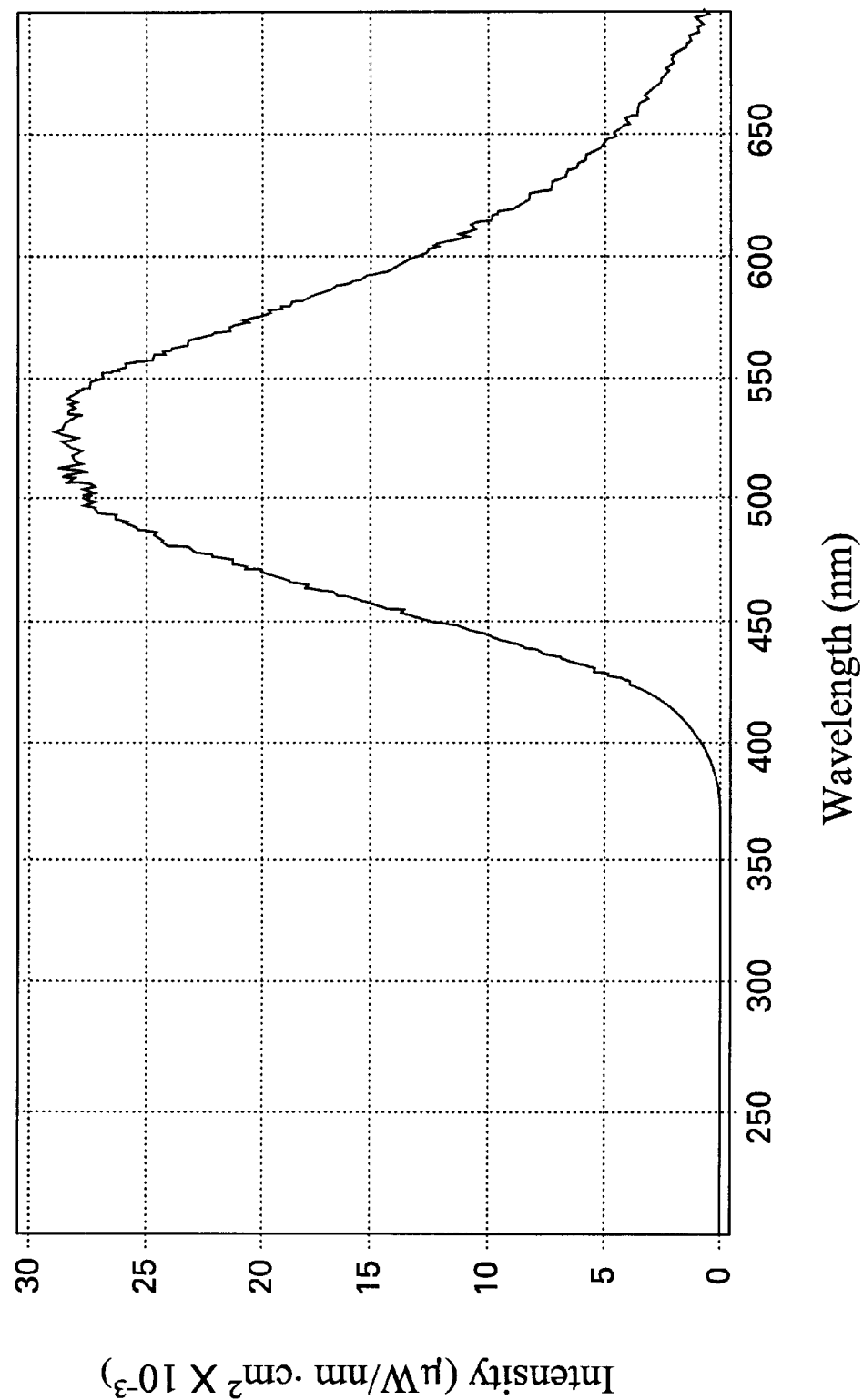
FIG. 2 is an emission spectrum of the $CsLu(WO_4)_2$ scintillator of the present invention under X-ray excitation having a peak energy of 60 keV from a tungsten anode.
Figure 3:
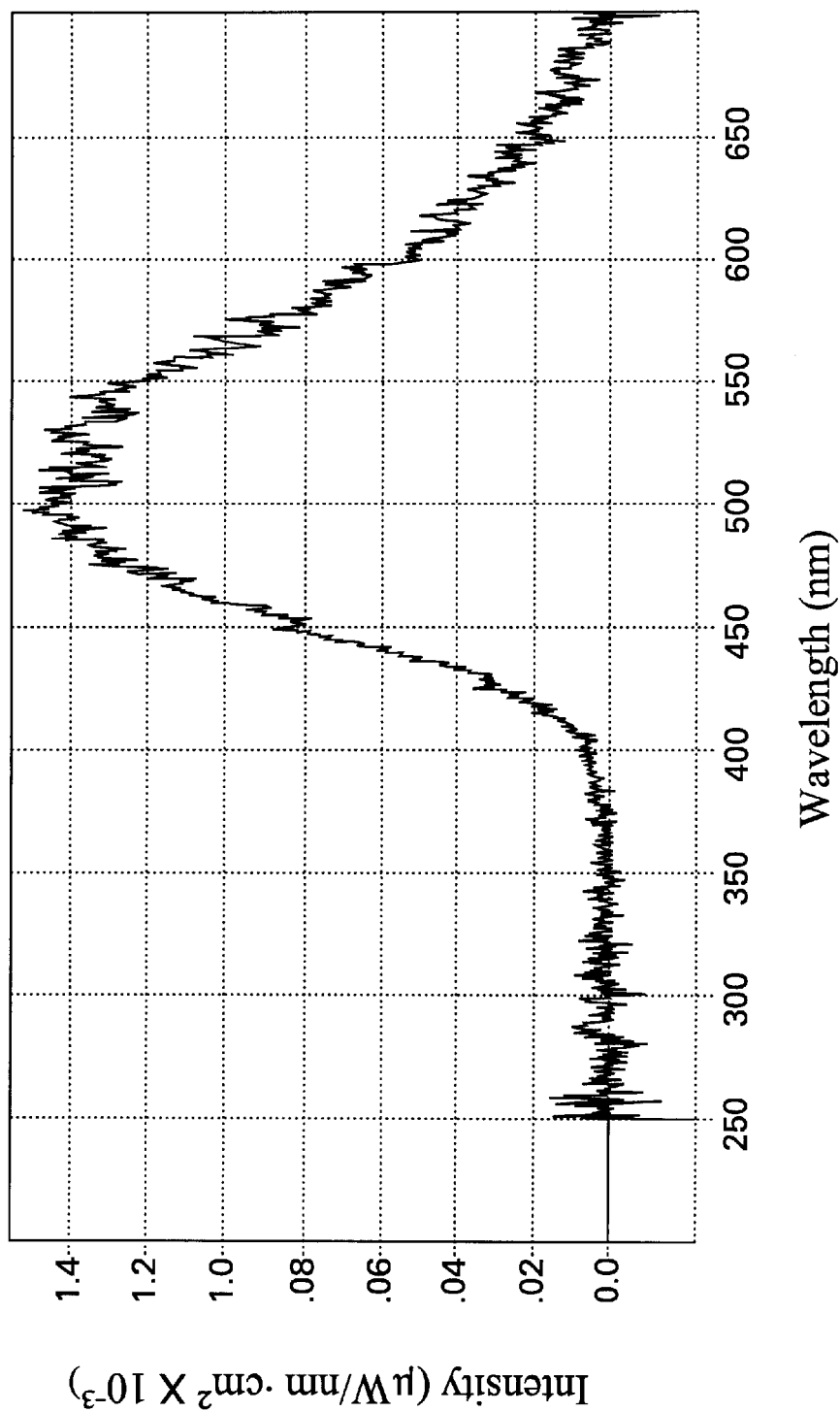
FIG. 3 is an emission spectrum of the $CsY(WO_4)_2$ scintillator of the present invention under X-ray excitation having a peak energy of 60 keV from a tungsten anode.
Figure 4:
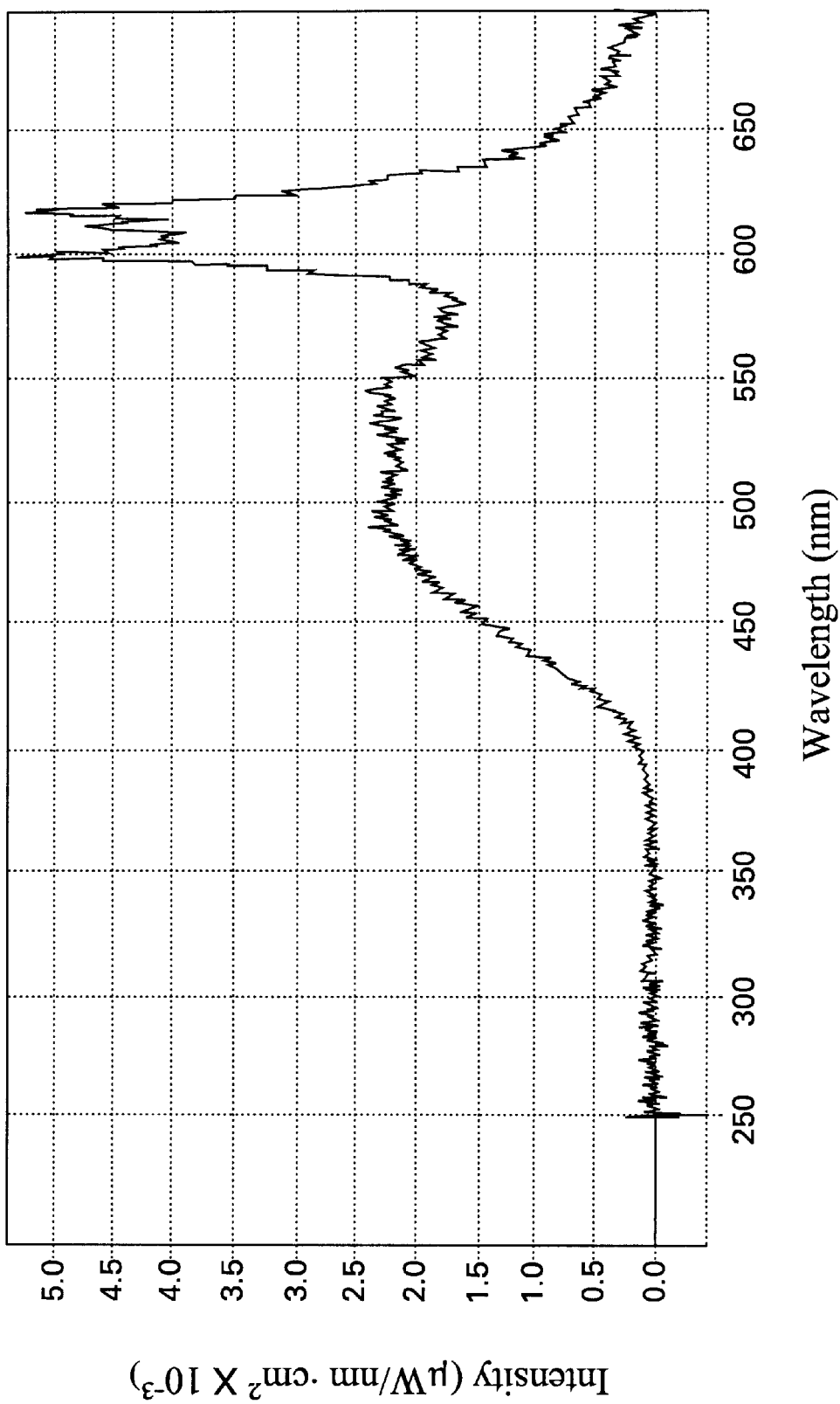
FIG. 4 is an emission spectrum of the $RbGd(WO_4)_2$ scintillator of the present invention under X-ray excitation having a peak energy of 60 keV from a tungsten anode.
Figure 5:
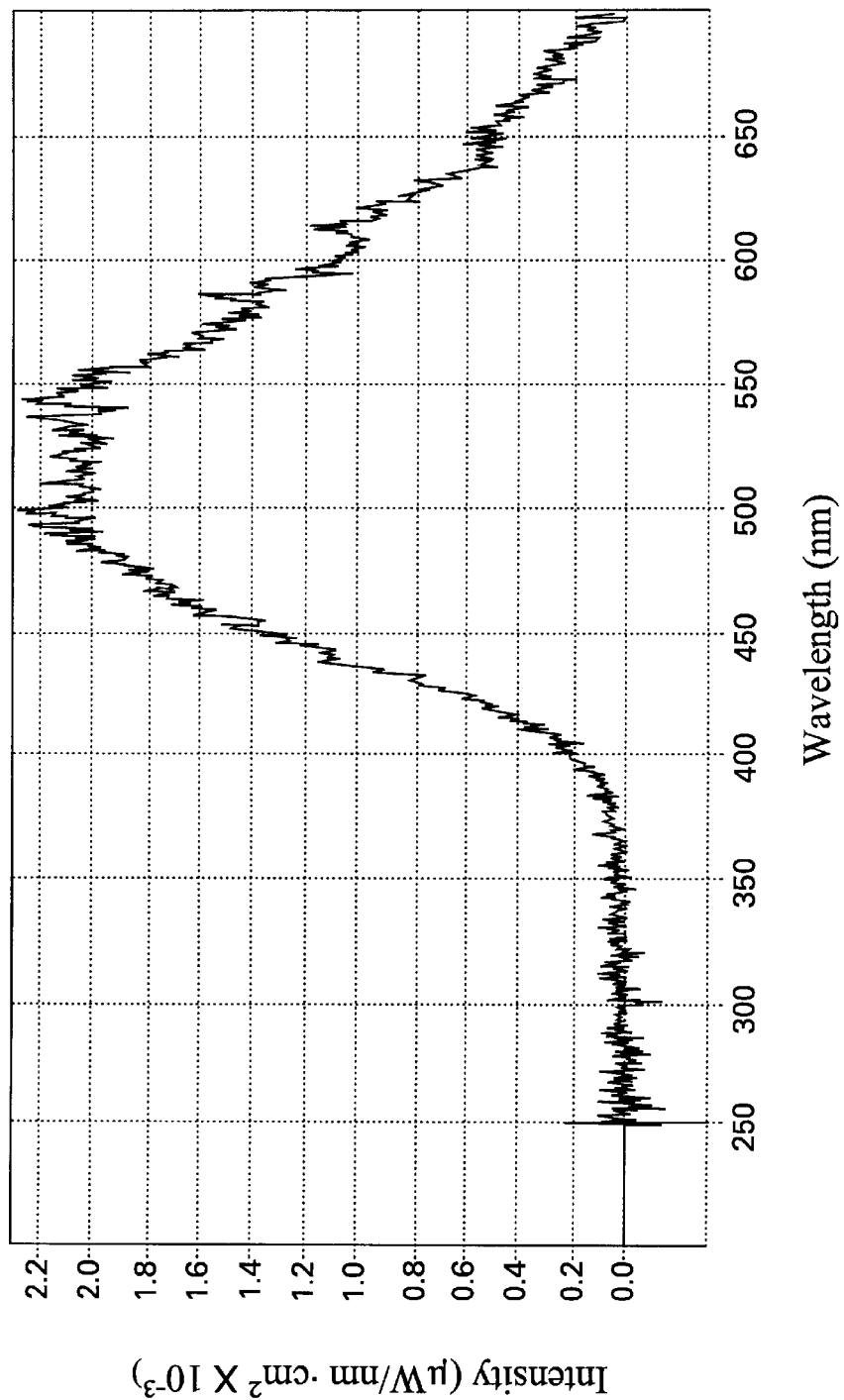
FIG. 5 is an emission spectrum of the $RbLu(WO_4)_2$ scintillator of the present invention under X-ray excitation having a peak energy of 60 keV from a tungsten anode.
Figure 6:
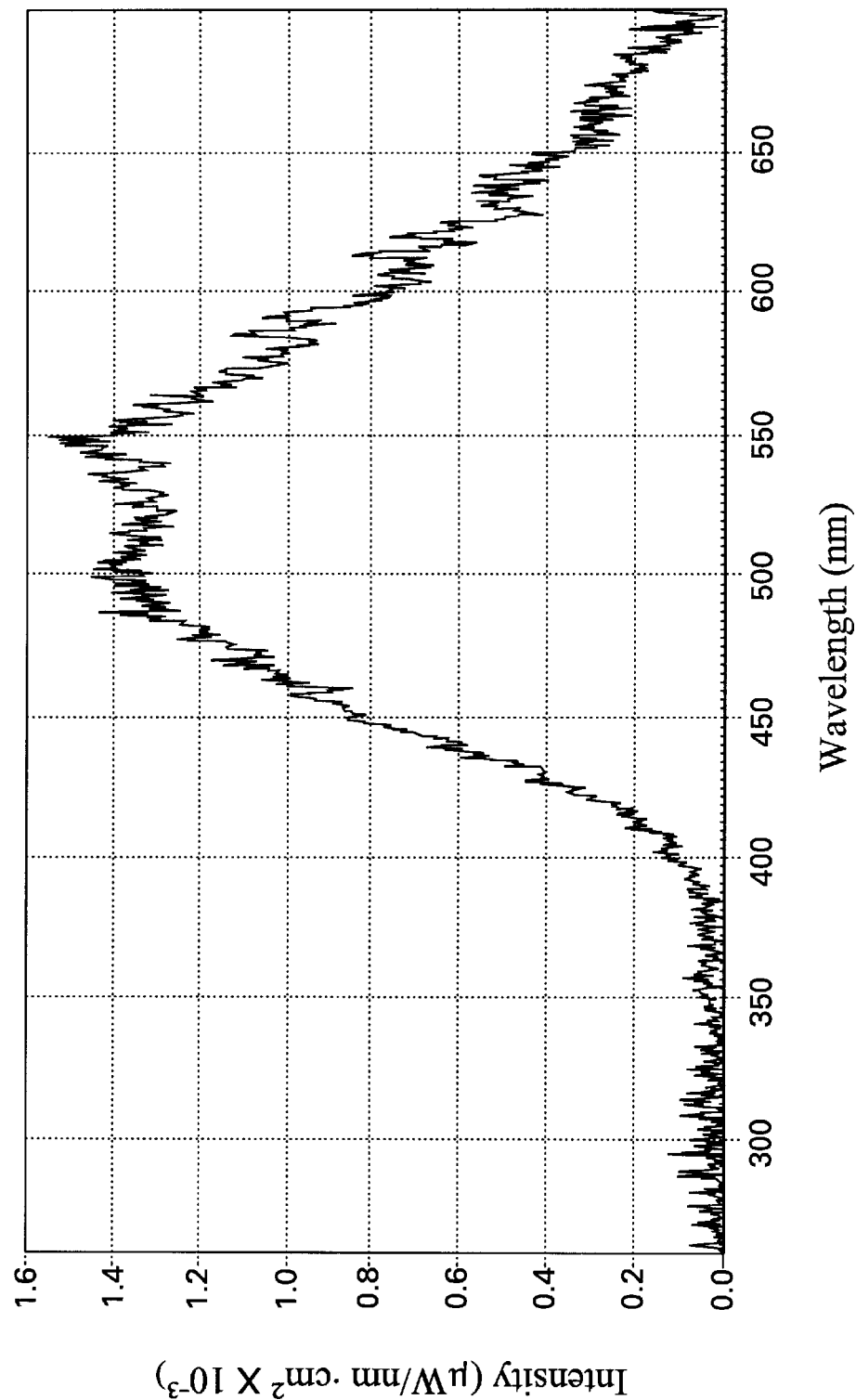
FIG. 6 is an emission spectrum of the $RbY(WO_4)_2$ scintillator of the present invention under X-ray excitation having a peak energy of 60 keV from a tungsten anode.

The present invention provides alkali and rare-earth tungstate scintillators that are self-activated and have high density. Particularly, the scintillators are pyrotungstate. In preferred embodiments, the scintillators are double tungstates. All metals disclosed herein are present in the scintillator compositions in combined form, usually as the oxide, rather than in elemental form. In one aspect of the present invention, the scintillators are responsive to X-ray excitation and have high light output, reduced afterglow, short decay time, and high X-ray stopping power.

As used herein, the term "light output" is the quantity of visible light emitted by the scintillator after being excited by a pulse of X-ray having an average intensity of about 33 keV, a peak intensity of 60 keV, and having a duration of 500 milliseconds. For ease of comparison, the light output presented in this disclosure is a relative quantity compared to the light output of an established standard europium-activated yttrium gadolinium oxide scintillator. The term "afterglow" is the light intensity emitted by the scintillator at 100 milliseconds after the X-ray excitation ceases, reported as a percentage of the light emitted while the scintillator is excited by the X radiation. The term "decay time," "primary decay," or "primary speed" is the time required for the intensity of the light emitted decreases to about 36.8% (or 1/e) of the light intensity at the time when the X-ray excitation ceases. The term "stopping power" refers to the ability of a material to absorb X-radiation, commonly called the attenuation or absorption. A material having a high stopping power allows little or no X-radiation to pass through. The stopping power is directly related to the density of the scintillator and the elements contained therein. Thus, it is advantageous to produce scintillators having high density. The term "radiation damage" refers to the characteristic of a luminescent material in which the quantity of light emitted by the luminescent material in response to a given intensity of stimulating radiation changes after the material has been exposed to a high radiation dose.

Higher light output is advantageous because a lower amount of X-ray excitation energy is required. Thus, the patient is exposed to a lower dose of X-ray energy. Reduced afterglow is advantageous because the image is sharper and free from image artifacts, sometimes referred to as "ghost images." Shorter decay time is preferred because the scan time can be reduced, resulting in more efficient use of the CT system. Higher stopping power is preferred because only a smaller quantity of scintillator is needed. Thus, thinner detectors are possible, resulting in lower cost of manufacture. Low radiation damage is advantageous because the sensitivity of the scintillator to exciting radiation remains substantially constant over a long-term use.

The scintillator compositions of the present invention are alkali and rare-earth tungstates and have a general formula of $AD(WO_4)_n$; wherein A is at least one element selected from the group consisting of Na, K, Rb, and Cs; D is at least one rare-earth element selected from the group consisting of Y, La, Ce, Pr, Nd, Pm, Sm, Eu, Gd, Tb, Dy, Ho, Er, Tm, Yb, and Lu; and n is greater than or equal to 2. Preferably, A is Rb or Cs and n is equal to 2.

In one embodiment of the present invention, the scintillator composition have a formula of $CsY_{1-x}Gd_x(WO_4)_2$ or $CsLa_{1-y}Lu_y(WO_4)_2$, wherein $0 \leq x \leq 1$ and $0 \leq y \leq 1$, and are useful as an X-ray scintillator. Such scintillators efficiently absorb X radiation and emit electromagnetic radiation in the visible region. Preferably, x and y are in the range from about 0.6 to 1, preferably from about 0.7 to 1, and more preferably from 0.75 to 1.

In addition, the scintillators of the present invention can include minor amounts of praseodymium oxide, terbium oxide, or a combination thereof, such as amounts from about 2 to about 500 mole parts per million ("ppm"), to further reduce the afterglow of the scintillators. Furthermore, the scintillators of the present invention can include a minor amount of an element, such as calcium, cerium, or dysprosium that reduces the likelihood of radiation damage. An adequate amount of radiation damage-reducing element may be in the range from about 2 to about 500 mole ppm.

Table 1 shows the light output, afterglow, decay time and stopping power of several scintillators of the present invention.

TABLE 1

| Composition | Density (g/cm$^3$) | Light Output (%) | Afterglow (%) | Decay Time (microseconds) | Stopping Power at 80 keV | Thickness Compared to Standard Scintillator for Same Stopping Power (%) |
|---|---|---|---|---|---|---|
| CsLuW$_2$O$_8$ | 7.7 | 10 | 0.56 | 40–50 | 44.53 | 39 |
| CsYW$_2$O$_8$ | 6.61 | 88 | 0.04 | 40–50 | 32.5 | 53.3 |
| CsGdW$_2$O$_8$ | 7.27 | 69 | 0.03 | — | 39.7 | 43.6 |
| CsGdW$_2$O$_8$ | 7.27 | 74 | 0.03 | 32 | 39.7 | 43.6 |
| CsGdW$_2$O$_8$ doped with Ce | 7.27 | 63 | 0.0071 | — | — | — |
| CsY$_{0.5}$Gd$_{0.5}$W$_2$O$_8$ | 6.94 | 149 | 0.0104 | — | — | — |
| CsY$_{0.25}$Gd$_{0.75}$W$_2$O$_8$ | 7.1 | 152 | 0.0171 | — | — | — |

Table 1 shows that many scintillators of the present invention have comparable or much higher light output compared to an established standard europium-doped yttrium gadolinium oxide scintillator, afterglow lower than the acceptable level of 0.2%, decay time shorter than the acceptable level of 500 microseconds, and higher X-ray stopping power as exhibited by a smaller thickness to achieve the same stopping power as the standard scintillator.

The scintillator compositions of the present invention may be prepared by a dry or a wet synthesis method. A dry method comprises the steps of (1) providing appropriate amounts of (a) compounds of at least one alkali metal selected from the group consisting of Na, K, Rb, and Cs, (b) compounds of at least one rare-earth element selected from the group consisting of Y, La, Ce, Pr, Nd, Pm, Sm, Eu, Gd, Tb, Dy, Ho, Er, Tm, Yb, and Lu, and (c) at least one oxygen-containing compound of tungsten; (2) mixing together the compounds to form a mixture; (3) optional adding at least one fluxing compound selected from the group consisting of halides of Na, K, Rb, Cs, Y, La, Ce, Pr, Nd, Pm, Sm, Eu, Gd, Tb, Dy, Ho, Er, Tm, Yb, and Lu in the mixture in a quantity sufficient to act as a flux, such as from about 0.001 up to about 2 mole percent; and (4) firing the mixture under an oxygen-containing atmosphere at a temperature and for a time sufficient to convert the mixture to a solid solution of alkali and rare-earth tungstate. The compounds of alkali metals and of rare-earth metals are compounds that are readily converted into oxides at the firing temperature under an oxygen-containing atmosphere. These compounds are preferably oxygen-containing compounds, such as oxides, nitrates, acetates, oxalates, sulfates, phosphates, or combinations thereof. The mixture may be mixed thoroughly in a blender or a pulverization apparatus, such as a ball mill, a bowl mill, a hammer mill, or a jet mill. The firing of the compound mixture is carried out at a temperature in the range from about 900° C. to about 1600° C., preferably from about 1000° C. to about 1500° C. under an oxygen-containing atmosphere such as air, oxygen, or a mixture of oxygen and an inert gas selected from the group consisting of nitrogen, helium, neon, argon, krypton, and xenon. The firing time is typically in a range from about 15 minutes to about 10 hours. The fired material may be pulverized afterward to provide a tungstate scintillator in a powder form for further processing into X-ray detector elements.

The wet process of preparation comprises the steps of (1) preparing a first solution having appropriate amounts of (a) compounds of at least compounds of at least one alkali metal selected from the group consisting of Na, K, Rb, and Cs, (b) compounds of at least one rare-earth element selected from the group consisting of Y, La, Ce, Pr, Nd, Pm, Sm, Eu, Gd, Tb, Dy, Ho, Er, Tm, Yb, and Lu, and (c) at least one compound of tungsten; (2) providing a second solution selected from the group consisting of hydroxides of at least one of Na, K, Rb, and Cs and alkyl esters of a dicarboxylic acid selected from the group consisting of oxalic acid, malonic acid, succinic acid, and glutaric acid; (3) mixing the first solution into the second solution to precipitate a mixture of oxygen-containing compounds of at least one alkali metal, at least one rare-earth metal, and tungsten; (4) separating the precipitate mixture from the supernatant liquid; (5) drying the precipitate mixture; (5) optionally calcining in an oxygen-containing atmosphere; and (6) firing the calcined material at a temperature for a time sufficient to convert the calcined material to an alkali and rare-earth tungstate scintillator. One or more compounds of halides of Na, K, Rb, Cs, Y, La, Ce, Pr, Nd, Pm, Sm, Eu, Gd, Tb, Dy, Ho, Er, Tm, Yb, Lu, and W may be added in a minor amount into the first solution, such as from about 0.001 up to about 2 mole percent, to act as a fluxing compound during the firing of the mixture. The first solution may be added slowly, such as drop-wise, into the second solution while the second solution is stirred. Calcination may be carried out at a temperature in the range from about 400° C. to about 900° C. under an atmosphere oxygen-containing gas, such as air, oxygen, or a mixture of oxygen and an inert gas selected from the group consisting of nitrogen, helium, neon, argon, krypton, and xenon. The firing may be carried out under a condition as stated above for the dry method; i.e., at a temperature in the range from about 900° C. to about 1600° C., preferably from about 1000° C. to about 1500° C. under an oxygen-containing atmosphere such as air, oxygen, or a mixture of oxygen and an inert gas selected from the group consisting of nitrogen, helium, neon, argon, krypton, and xenon; for a time in a range from about 15 minutes to about 10 hours. The calcination and firing atmosphere may be the same or may have different compositions. The calcination and firing steps may be conducted in a batch-wise or continuous process with a static or flowing gas atmosphere. After firing, the alkali and rare-earth tungstate scintillators of the present invention may be pulverized as disclosed above to produce the scintillator in the powder form which can be pressed into compacted scintillators for use in detectors of X-ray CT systems. The powder may be compacted by a method such as hot pressing or hot isostatic pressing into desired shaped bodies.

In another aspect of the present invention, the composition of the scintillator and the firing temperatures are chosen such that the final scintillator is substantially a solid solution. A solid solution is most preferred because the X-ray detecting element would have a substantially uniform composition, refractive index, and higher light output.

Alternatively, the scintillators may be produced in single crystal form. In this process, a seed crystal of the desired composition is introduced into a saturated solution containing appropriate compounds and new crystalline material is allowed to grow and add to the seed crystal using any well-known crystal growth method.

In another embodiment of the present invention, the scintillators may be crystallized as a ceramic from a melt containing boric oxide ($B_2O_3$) and appropriate amounts of (a) oxides of at least an alkali metal selected from the group consisting of Na, K, Rb, and Cs, (b) oxides of at least a rare-earth metal selected from the group consisting of Y, La, Ce, Pr, Nd, Pm, Sm, Eu, Gd, Tb, Dy, Ho, Er, Tm, Yb, and Lu, and (c) tungsten oxide ($WO_3$). Such a recrystallization allows for the net-shape fabrication of light piping structures, such as rods or fibers that find applications in long-distance fiber optics. Cosintered composites of a low-melting index matched glass and tungstate scintillators of the present invention also can readily be made into desired net shapes to avoid extra costs of machining the ceramic pieces. Examples of suitable low-melting index matched glass are $Cs_2O$—$B_2O_3$—$Al_2O_3$ or $CsF$—$Cs_2O$—$B_2O_3$ glasses.

While various embodiments are described herein, it will be appreciated from the specification that various combinations of elements, variations, equivalents, or improvements therein may be made by those skilled in the art, and are still within the scope of the invention as defined in the appended claims.

What is claimed is:

1. A scintillator composition consisting of a tungstate having a formula of $AD(WO_4)_n$, wherein A is at least one element selected from group consisting of Na, K, Rb, and Cs; D is a single element selected from the group consisting of Y, La, Gd, and Lu; and n is greater than or equal to 2; and wherein said scintillator composition is doped with $Ca^{2+}$ ion in an amount from about 2 to about 500 mole per million.

2. The scintillator composition according to claim 1, wherein n is 2.

3. A scintillator composition comprising a tungstate having a formula of $AD((WO_4)_n$, wherein A is at least one element selected from group consisting of Na, K, Rb, and Cs; D is at least one rare-earth element selected from the group consisting of Y, La, Ce, Pr, Nd, Pm, Sm, Eu, Gd, Tb, Dy, Ho, Er, Tm, Yb, and Lu; and n is greater than or equal to 2; and wherein the scintillator composition is further doped with $Ca_{2+}$ ion in an amount from about 2 to about 500 mole parts per million.

4. A scintillator composition comprising a tungstate having a formula of $CsY(WO_4)_2$.

5. The scintillator composition according to claim 4, wherein said scintillator composition is doped with $Ca_{2+}$ ion in an amount from about 2 to about 500 mole parts per million.

6. A scintillator composition comprising a tungstate having a formula of $AD((WO_4)_n$, wherein A is at least one element selected from group consisting of Rb and Cs; D is at least an element selected from the group consisting of Y, La, Gd, and Lu; and n is greater than or equal to 2, wherein said scintillator composition is doped with an ion selected from the group consisting of ions of Ca, Dy, Ce, Pr, and Tb, and wherein said ion is present in an amount from about 2 to about 500 mole parts per million.

7. A scintillator composition comprising a tungstate having a formula of $CsY_{1-x}Gd_x(WO_4)_2$ wherein $0 \leq x \leq 1$, said scintillator composition being doped with $Ca^{2+}$ ion in an amount in a range from about 2 to about 500 mole parts per million.

8. A scintillator composition comprising of a tungstate having a formula of $CsLa_{1-y}Lu_y(WO_4)_2$ wherein $0 \leq y \leq 1$; said scintillator composition being doped with ions selected from the group consisting of ions of Dy, Ce, Pr, and Tb; said ions being present in an amount in a range from about 2 to about 500 mole parts per million.

9. The scintillator composition according to claim 8, wherein y is in a range from about 0.6 to 1.

10. The scintillator composition according to claim 8, wherein y is in a range from about 0.7 to 1.

11. The scintillator composition according to claim 8, wherein y is in a range from about 0.75 to 1.

12. A scintillator composition comprising of a tungstate having a formula of $CsLa_{1-y}Lu_y(WO_4)_2$ wherein $0 \leq y \leq 1$; said scintillator composition being doped with $Ca^{2+}$ ions; said $Ca_{2+}$ ions being present in an amount in a range from about 2 to about 500 mole parts per million.

13. A method for producing an alkali- and rare earth-containing scintillator composition, said method comprises the steps of:
   (1) providing amounts of:
       (a) oxygen-containing compounds of at least one alkali metal selected from the group consisting of Na, K, Rb, and Cs,
       (b) oxygen-containing compounds of at least one rare-earth element selected from the group consisting of Y, La, Ce, Pr, Nd, Pm, Sm, Eu, Gd, Tb, Dy, Ho, Er, Tm, Yb, and Lu, and
       (c) at least one oxygen-containing compound of tungsten;
   (2) mixing together the compounds to form a mixture;
   (3) mixing at least one halide of an element selected from the group consisting of Na, K, Rb, Cs, Y, La, Ce, Pr, Nd, Pm, Sm, Eu, Gd, Tb, Dy, Ho, Er, Tm, Yb, and Lu in said mixture in a quantity sufficient to act as flux during a firing; said halide being present in a range from about 0.001 to about 2 mole percent; and
   (4) firing the mixture under an oxygen-containing atmosphere at a temperature and for a time sufficient to convert the mixture to a solid alkali- and rare earth-containing tungstate;
   wherein said amounts of oxygen-containing compounds are chosen to obtain the final desired composition of said alkali- and rare earth-containing tungstate.

14. The method according to claim 13, wherein said temperature is in a range from about 900° C. to about 1600° C.

15. The method according to claim 14, wherein said temperature is in a range from about 1000° C. to about 1500° C.

16. A method for producing an alkali- and rare earth-containing scintillator composition, said method comprises the steps of:
   (1) preparing a first solution from amounts of:
       (a) compounds of at least one alkali metal selected from the group consisting of Na, K, Rb, and Cs,
       (b) compounds of at least one rare-earth element selected from the group consisting of Y, La, Ce, Pr, Nd, Pm, Sm, Eu, Gd, Tb, Dy, Ho, Er, Tm, Yb, and Lu, and
       (c) at least one compound of tungsten;

(2) providing a second solution selected from the group consisting of hydroxides of at least one element selected from the group consisting of Na, K, Rb, and Cs and alkyl esters of a dicarboxylic acid selected from the group consisting of oxalic acid, malonic acid, succinic acid, and glutaric acid;

(3) mixing together said first solution and said second solution to form a precipitate mixture of oxygen-containing compounds of at least one alkali metal, at least one rare-earth metal, and tungsten;

(4) separating said precipitate mixture from a supernatant liquid;

(5) drying said separated precipitate mixture; and (6) firing said dried precipitate mixture at a temperature for a time sufficient to convert said dried precipitate mixture to an alkali- and rare earth-containing tungstate scintillator;

wherein said amounts of compounds are chosen to obtain the final desired composition of said alkali- and rare earth-containing tungstate.

17. The method of claim 16 further comprising the step of adding at least one halide of an element selected from the group consisting of Na, K, Rb, Cs, Y, La, Ce, Pr, Nd, Pm, Sm, Eu, Gd, Tb, Dy, Ho, Er, Tm, Yb, and Lu in said first solution in a quantity sufficient to act as a flux during said firing.

18. The method according to claim 17, wherein said quantity of said halide is in a range from about 0.001 to about 2 mole percent.

19. The method according to claim 16 further comprising the step of calcining said dried separated precipitate mixture in an atmosphere containing oxygen at a temperature in a range from about 400° C. to about 900° C. before the firing step.

20. The method according to claim 16, wherein said firing is conducted at a temperature in a range from about 900° C. to about 1600° C.

21. The method according to claim 20, wherein said temperature is in a range from about 1000° C. to about 1500° C.

22. A detector element of an X-ray CT scanner comprising a scintillator composition, which consists of a tungstate having a formula of $AD(WO_4)_n$, wherein A is at least one element selected from group consisting of Na, K, Rb, and Cs; D is a single element selected from the group consisting of Y, La, Gd, and Lu; and n is greater than or equal to 2.

23. A detector element of an X-ray CT scanner comprising a scintillator composition, which consists of a tungstate having a formula of $AD((WO_4)_2$, wherein A is at least one element selected from group consisting of Na, K, Rb, and Cs; D is a single element selected from the group consisting of Y, La, Gd, and Lu; and n is greater than or equal to 2.

24. A detector element of an X-ray CT scanner comprising a scintillator composition, which comprises a tungstate having a formula of $CsY_{1-x}Gd_x(WO_4)_2$ wherein $0 \leq x \leq 1$.

25. A detector element of an X-ray CT scanner comprising a scintillator composition, which comprises a tungstate having a formula of $CsLa_{1-y}Lu_y(WO_4)_2$ wherein $0 \leq y \leq 1$.

26. A scintillator composition comprising of a tungstate having a formula of $AD((WO_4)_n$, wherein A is at least one element selected from group consisting of Rb and Cs; D is at least one rare-earth element selected from the group consisting of Y, La, Gd, and Lu; and n is greater than or equal to 2; and wherein the scintillator composition further comprises an element selected from the group consisting of praseodymium, terbium, cerium, and dysprosium; said element selected from the group consisting of praseodymium, terbium, cerium, and dysprosium being present in an amount from about 2 to about 500 mole percent.

27. A scintillator composition comprising of a tungstate having a formula of $CsGd(WO_4)_2$, said scintillator composition being doped with cerium in an amount from about 2 to about 500 mole parts per million.

28. A scintillator composition comprising a tungstate having a formula of $CsY_{0.25}Gd_{0.75}(WO_4)_2$.

29. A scintillator composition comprising a tungstate having a formula of $CsY_{0.5}Gd_{0.5}(WO_4)_2$.

* * * * *